March 25, 1924.
T. J. JUDGE
JACK FOR VEHICLES
Filed Sept. 28, 1922
1,488,205
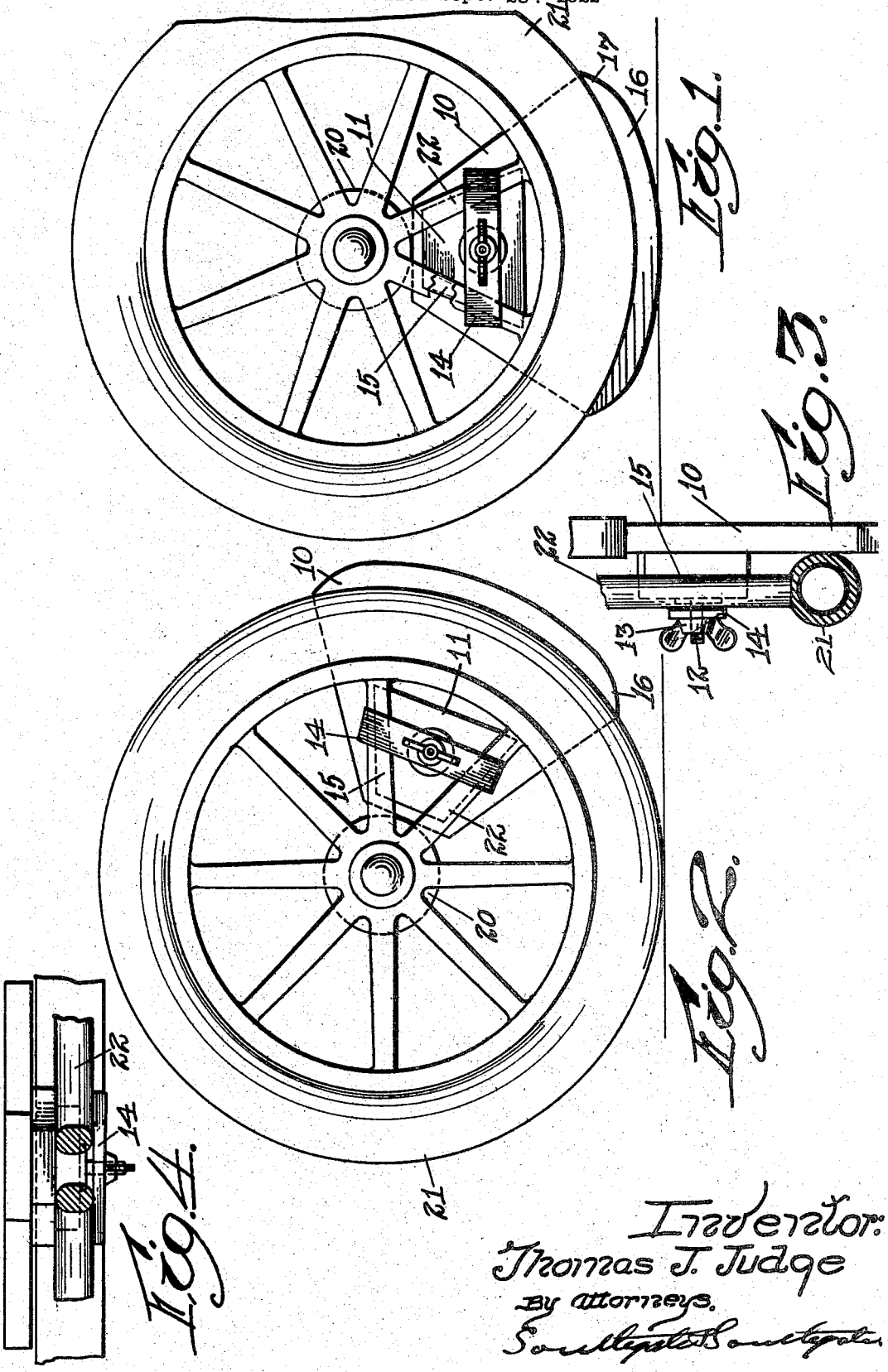
Inventor:
Thomas J. Judge
By Attorneys Patented Mar. 25, 1924.

1,488,205

UNITED STATES PATENT OFFICE.

THOMAS J. JUDGE, OF NORTHBORO, MASSACHUSETTS.

JACK FOR VEHICLES.

Application filed September 28, 1922. Serial No. 591,161.

*To all whom it may concern:*

Be it known that I, THOMAS J. JUDGE, a citizen of the United States, residing at Northboro, in the county of Worcester and State of Massachusetts, have invented a new and useful Jack for Vehicles, of which the following is a specification.

This invention relates to a jack adapted to be applied to the wheel of a vehicle, particularly an automobile, for lifting it by its own power and leaving it lifted in a stable condition for the purpose of changing tires and the like.

The principal objects of the invention are to provide a simple and convenient device for the above mentioned purpose adapted to be applied between two spokes of a wheel and to be secured in position quickly and in a very simple manner and also to provide it in such a way that when the vehicle is moved slightly in one direction the jack will come into operation automatically and lift the wheel without any operation of the jack from under the vehicle.

Reference is to be had to the accompanying drawings, in which—

Fig. 1 is a side view of an automobile wheel showing it lifted by this jack;

Fig. 2 is a similar view showing it in the position assumed before or after the lifting operation;

Fig. 3 is a front edge view showing its relation to the wheel; and

Fig. 4 is a plan showing the wheel spokes in section.

The invention is shown in a form involving a block 10 of wood, pressed metal or cast metal of a generally triangular shape and having a projection 11 of a similar shape adapted to be received between the spokes of a wheel. This projection is slightly less in thickness than the thickness of the spokes or at least it is not greater than that.

It is provided with a threaded bolt 12 fixed to it and projecting from it. On this is located a wing nut 13 or any other kind of a nut and below the nut there is pivoted on the bolt a cross bar 14 adapted to swing into any desired position.

The block 10 is of a general triangular shape cut back along its edges to form two converging ledges 15 on which the spokes are secured and supported. The block 10 extends down to provide a curved surface 16 below the tire 21 and having a gradual curve 17 at each end to a point adjacent to the circumference of the tire 21. These surfaces 16 and 17 constitute the bottom of the block and the surface 16 is preferably curved on the center of the wheel as a center.

In the use of the device the cross bar 14 is turned to a position at right angles to those shown and the projection 11 entered through the space between two spokes 22 from the rear or inner side of the wheel in the position shown in Fig. 2. The cross bar 14 is then turned to the position shown in that figure to rest on the outside of the two adjacent spokes, the block being located between them. It is assumed that at this time the nut 13 is loose so that these operations can be performed conveniently. Now, the nut is tightened to hold the jack in place on the wheel and either the engine is started to move the car forward or back or it can be pushed to bring the parts around to the position shown in Fig. 1.

It will be seen that the projecting surface 16 will extend far enough below the tire to lift the whole tire and wheel up so that the tire is relieved from pressure on the ground and is held elevated. It is to be noted that the wheel cannot be turned in this position and the tire and rim can be removed more readily on that account because the wheel is fixed in position and there is no danger of the operator injuring his knuckles on account of accidental turning of the wheel as is the case with the use of ordinary jacks.

When the jack is in the position shown in Fig. 1, that side of the car is held up by it. It has two sets of surfaces which perform this function. The converging surfaces of the triangular projections 11 come between the spokes and support the wheel by the resting of the spokes on these surfaces. The surfaces 15 support the wheel.

It will be seen therefore that this jack provides the above mentioned advantages in a most convenient and simple manner and that a tire and rim can be changed in a very easy way without getting under the car or running any risk of the jack slipping out from under the axle as has been the case heretofore.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described but what I do claim is—

1. As an article of manufacture, a jack adapted to be attached to the side of a wheel, comprising a block having a surface extending beyond the tire and provided with a lateral projection of general triangular shape projecting through the space between two spokes and adapted to fit against their sides substantially throughout their length, and means extending from said projection for fixing the projection and block to the spokes of the wheel.

2. As an article of manufacture, a jack for the wheel of a vehicle comprising a substantially flat triangular block having a surface projecting materially beyond the tire of the wheel provided with gradually curved ends having means for fixing it to the spokes of the wheel, and having opposite flat converging surfaces for engaging the spokes and having an end surface adapted to engage the hub to support the wheel.

3. As an article of manufacture, a jack adapted to be attached to the side of a wheel over the inner surface between two adjacent spokes, comprising a block having a surface extending beyond the tire and provided with a projection of a general triangular shape projecting through the space between two spokes and adapted to fit against the adjacent sides of them, a bolt extending from said projection for fixing the projection and block to the wheel, a nut on the bolt, and a cross bar adapted to swing on said bolt and to engage the opposite outer side of said spoke.

In testimony whereof I have hereunto affixed my signature.

THOMAS J. JUDGE.